March 9, 1926.  1,575,711
J. F. O'CONNOR
FRICTION SHOCK ABSORBING MECHANISM
Filed April 13, 1925  2 Sheets-Sheet 2
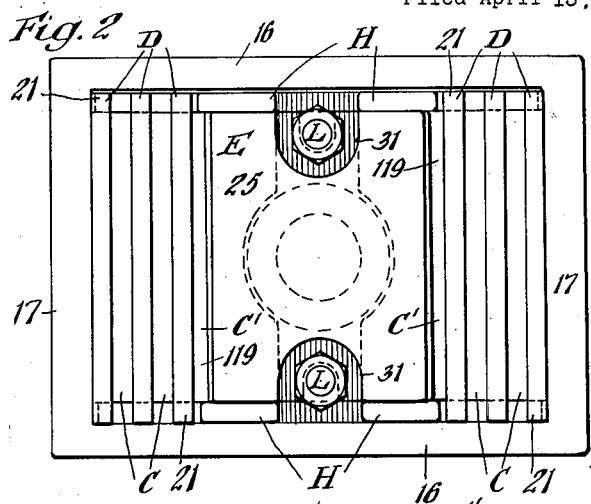
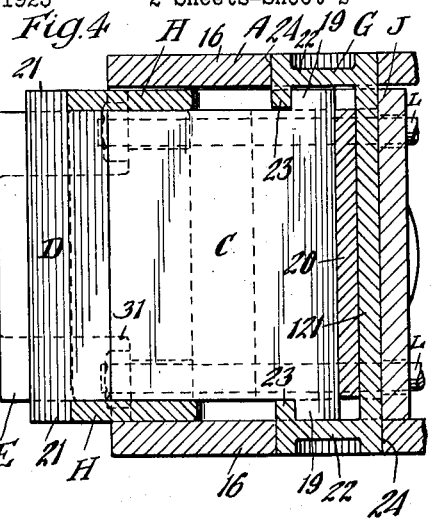
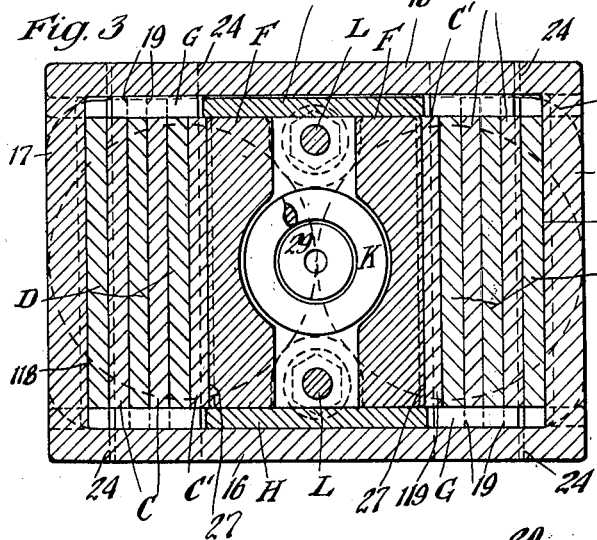
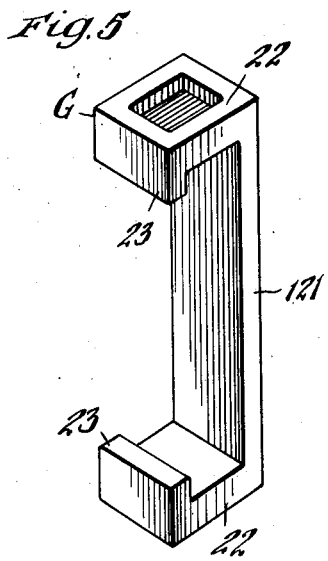
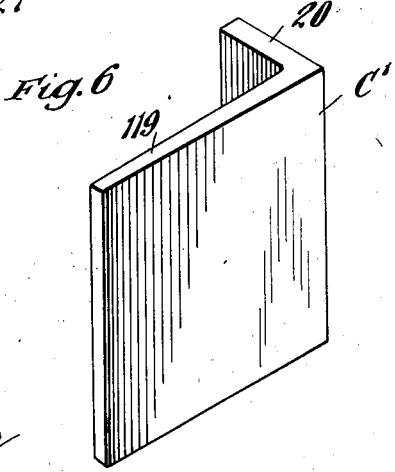
Witness
Wm. Geiger
Inventor
John F. O'Connor
By George I. Haight
His Atty Patented Mar. 9, 1926.

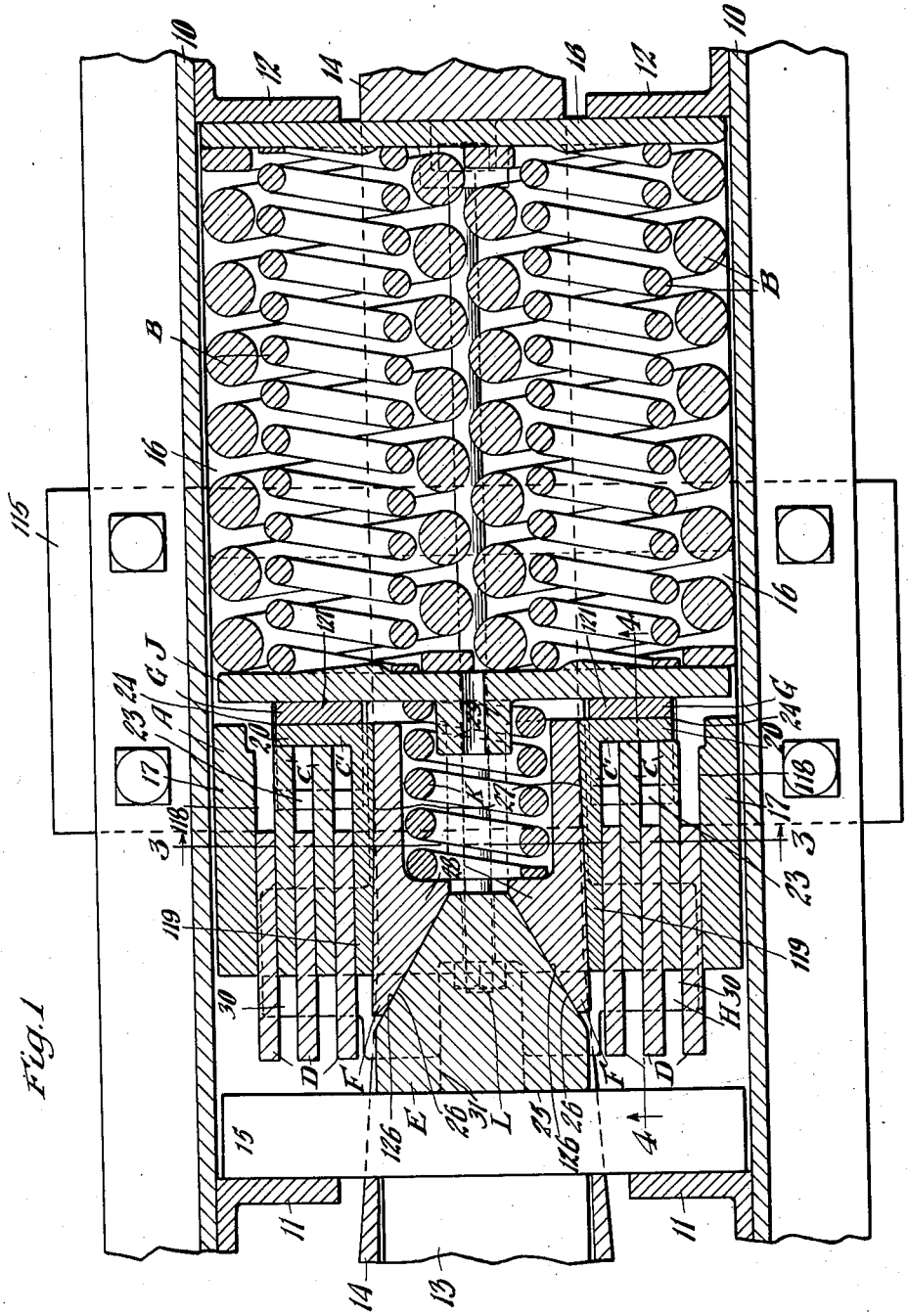

1,575,711

UNITED STATES PATENT OFFICE.

JOHN F. O'CONNOR, OF CHICAGO, ILLINOIS, ASSIGNOR TO W. H. MINER, INC., OF CHICAGO, ILLINOIS, A CORPORATION OF DELAWARE.

FRICTION SHOCK-ABSORBING MECHANISM.

Application filed April 13, 1925. Serial No. 22,516.

*To all whom it may concern:*

Be it known that I, JOHN F. O'CONNOR, a citizen of the United States, residing at Chicago, in the county of Cook and State of Illinois, have invented a certain new and useful Improvement in Friction Shock-Absorbing Mechanisms, of which the following is a full, clear, concise, and exact description, reference being had to the accompanying drawings, forming a part of this specification.

This invention relates to friction shock absorbing mechanisms.

One object of the invention is to provide a high capacity shock absorbing mechanism especially adapted for railway draft riggings, having relatively light preliminary action, and heavier final combined frictional and spring resistance.

Another object of the invention is to provide a mechanism of the character indicated, having graduated combined frictional and spring resistance during the entire compression stroke of the mechanism.

A further object of the invention is to provide a friction shock absorbing mechanism including a friction wedge system, intercalated friction plates, a preliminary spring resistance and a main spring resistance, wherein an initial graduated frictional resistance followed by a heavier final resistance is had, the final frictional resistance being produced by the relative movement of the friction plates, there being no action of the friction plates during initial action, the graduated initial resistance being effected by the successive operation of the preliminary and main spring resistance elements.

A more specific object of the invention is to provide a friction shock absorbing mechanism including a plurality of relatively movable intercalated friction plates, a friction wedge-system co-operating with the plates for placing the same under lateral pressure, wherein the friction wedge system is movable relatively to the friction plates during initial operation of the mechanism, the movement of the friction wedge system being resisted successively by a preliminary and a main spring resistance and the plates being movable relatively to each other after the preliminary action referred to, to effect heavier frictional resistance during the remainder of the compression stroke of the mechanism.

Another and more specific object of the invention is to provide a shock absorbing mechanism, including a combined friction shell and spring cage; a plurality of intercalated friction plates associated with the friction shell, the plates being divided into two groups at opposite sides of the mechanism, certain of said plates being anchored to the shell and the remaining plates being movable relatively thereto; a wedge friction system interposed between the two groups of plates, said system including a wedge member and friction shoes co-operating with the faces of the innermost plates of the two groups, the opposed faces of the plates with which the shoes co-act converging rearwardly of the mechanism; a main spring resistance having a spring follower co-operating therewith, the follower being normally spaced from the inner ends of the shoes, and a preliminary spring resistance interposed between the spring follower and the shoes.

Other objects and advantages of the invention will more fully and clearly appear from the description and claims hereinafter following.

In the drawings, forming a part of this specification, Figure 1 is a longitudinal, horizontal, sectional view of a portion of a railway draft rigging, showing my improvements in connection therewith. Figure 2 is a front end elevational view of the shock absorbing mechanism proper. Figure 3 is a vertical, transverse, sectional view corresponding substantially to the line 3—3 of Figure 1. Figure 4 is a longitudinal, vertical, sectional view of the front end of the mechanism corresponding substantially to the line 4—4 of Figure 1. And Figures 5 and 6 are detailed, perspective views respectively of an anchoring element and one of the stationary friction plates employed in connection with my improved mechanism.

In said drawings, 10—10 indicate channel-shaped center or draft sills of a railway car underframe, to the inner surfaces of which are secured front stop lugs 11—11 and rear stop lugs 12—12. The inner end of the drawbar is indicated at 13, to which is operatively connected a hooded yoke 14 of well-known form. The shock absorbing mechanism proper, hereinafter more fully described, as well as a main follower 15, are disposed within the yoke. The yoke and the parts therewithin are supported in operative position by a detachable saddle plate 115.

My improved shock absorbing mechanism comprises, broadly, a combined spring cage and friction shell A; twin-arranged main spring resistance elements B—B; a series of stationary friction plates C—C and C'; a series of relatively movable friction plates D, D and D'; a main wedge E; a pair of wedge friction shoes F—F; a pair of anchoring elements G—G; a pair of combined wear and restoring plates H—H; a main spring follower J; a preliminary spring K; and a pair of retainer bolts L.

The combined spring cage and friction shell is in the form of a hollow-rectangular casting having top and bottom walls 16—16, relatively short, spaced, side walls 17—17 at the forward end thereof, and a vertical, transversely disposed end wall 18, the latter co-operating with the stop lugs 12 in the manner of the usual rear follower. As clearly shown in Figure 1, the casting A is left open at the opposite sides for the greater portion of its length, thereby providing for the lateral insertion of the main spring resistance elements B and the spring follower J. The side walls 17 of the spring cage are provided with opposed, interior, longitudinally extending friction surfaces 118—118. It will be evident that the forward end of the casting A provides a friction shell.

The friction plates C, C' and D are arranged in two groups at opposite sides of the mechanism as clearly shown in Figures 1, 2 and 3. The friction plates C, C and C' are relatively stationary with reference to the casting A while the plates D, D and D' are movable relatively thereto. Each group of friction plates preferably comprises three fixed plates C, C and C' and three movable plates D. Two plates C of each group are of identical construction, each plate being of flat rectangular form and having a pair of lugs 19 at the inner end thereof, the lugs 19 projecting respectively from the top and bottom edges of each plate. The plates C' of the two groups are also of similar construction and as most clearly shown in Figure 6, each plate C' comprises a longitudinally disposed, flat section 119 and a flange 20 at the rear end thereof disposed at right angles thereto. As most clearly shown in Figure 1, the opposed inner surfaces of the two plates C' converge slightly rearwardly of the mechanism. The three friction plates D, which are intercalated with the friction plates C, C and C' of each group, are also of similar construction. Each plate D is of rectangular form and has a pair of lugs 21 at the forward end thereof, the lugs 21 projecting respectively from the top and bottom edges of the plate. When the groups of plates are assembled, as most clearly shown in Figure 1, the plate C' of each group is disposed innermost with the flange 20 projecting laterally outwardly therefrom. the flange being of such a length that it forms an abutment for the inner ends of the remaining stationary plates C of each group.

The plates C C and C' of each group are anchored to the casting A by the anchoring element G most clearly shown in Figure 5. Each anchoring element G comprises a vertically disposed section 121 having rectangular, horizontally disposed sections 22—22 at the top and bottom ends thereof, the sections 22 being disposed at right angles to section 121 and extending forwardly therefrom. At the front end, each section 22 is provided with a rib 23, the ribs 23 of the two sections being in vertical alinement. The top and bottom walls 16—16 of the casing are provided with alined rectangular openings 24 at the opposite sides of the mechanism, each set of alined openings being adapted to receive the rectangular sections 22 of the corresponding anchoring element G. When the parts are assembled, the flange 20 of the plate C' of each group bears on the front face of the vertical section 121 of the corresponding anchoring element G and the lugs 19 of the plates C and C are engaged behind the ribs 23 of the element G. The three stationary plates of each group are thus anchored to the casting A against longitudinal movement but are permitted to have a certain amount of lateral movement.

The spring follower J which is in the form of a relatively heavy rectangular plate is interposed between the sections 121 of the anchoring elements G and the main spring resistance elements B, the latter having their rear ends bearing on the end wall 18 of the casing A.

The wedge E is in the form of a block having a transverse front end face 25 bearing directly on the inner surface of the follower 15. At the inner end, the wedge block E is provided with a pair of rearwardly converging flat wedge faces 26—26.

The friction wedge shoes F are of like construction, each provided with a longitudinal flat side face 27 adapted to engage the inner surface of the corresponding plate C'. On the inner side, each shoe at the forward end thereof is provided with a lateral enlargement 28 having an interior wedge face 126 at the forward end thereof correspondingly inclined to and adapted to co-operate with the wedge face 26 at the corresponding side of the wedge block E. As clearly shown in Figure 1, the wedge shoes F have their inner ends normally spaced from the front face of the spring follower J.

The preliminary spring resistance K is interposed between the front face of the spring follower J and the lateral enlargements on the friction wedge shoes F, the spring being held in centered position by a forwardly projecting boss 29 on the spring follower J.

The wear plates H are disposed at the top and bottom of the mechanism, as most clearly shown in Figure 3. Each wear plate H is of substantially T-shaped outline as most clearly shown in Figure 1, having laterally extending wings 30. The wings 30 of the top and bottom plates engage the inner edges of the corresponding lugs 21—21 of the movable friction plates. The inner ends of the wear plates H abut the front face of the spring follower J, the plates being forced to move forwardly with the spring follower during release and thus acting as restoring elements for returning the movable friction plates to normal position.

The retainer bolts L are disposed at the top and bottom of the mechanism and have their opposite ends anchored respectively to the rear wall 18 of the casting A and the wedge block E, the heads of the bolts at the forward end thereof being disposed in recesses 31 provided at the top and bottom of the wedge block E. Each of the recesses 31 is adapted to accommodate the head of the corresponding bolt during the compression stroke of the mechanism.

In assembling my improved shock absorbing mechanism, the main springs B and the spring follower J are inserted within the casting A through the openings in the sides thereof. The anchoring elements G may then be placed in position, the parts being so proportioned that the main springs B are preferably held under initial compression. It will be evident that the anchoring elements G may be placed in position either before or after the insertion of the spring follower J and the main spring resistance elements within the casing A. The relatively stationary friction plates C, C and C' of each group are then placed in position by first inserting the plates C and C of each group centrally between the two anchoring elements G, bringing the lugs 19 thereof in alinement with the openings between the ribs 23 and sections 121 of the anchoring elements and sliding the plates laterally in position to engage the lugs 19 thereof behind the ribs 23. At the same time, the plate C' of each group may be placed in position by inserting the flange 20 thereof between the inner ends of the plates C and the section 121 of the corresponding anchoring element. The combined wear and restoring plates are then placed in position and the movable plates inserted between the stationary plates C—C and C'. The preliminary spring, wedge friction shoes and wedge are then inserted and the wedge anchored to the casing A by the retainer bolts L.

The proportions and arrangements of the parts as most clearly shown in Figure 1 are such that the front ends of the movable friction plates are normally spaced a predetermined distance from the inner surface of the main follower 15, which is greater than the clearance left between the inner ends of the friction shoes and the spring follower J. It will be evident that the retainer bolts L maintain the parts of uniform overall length and that wear of the various friction and wedge surfaces of the elements of the mechanism is compensated for by the preliminary spring K which is preferably under initial compression.

The operation of my improved shock absorbing mechanism, assuming a compression stroke, is as follows: The follower 15 and the casting A will be moved relatively toward each other, forcing the wedge E inwardly of the casting A. A wedging action will thus be set up between the wedge E and the shoes F, at the same time compressing the preliminary spring K. The spreading action thus produced will compress the two groups of plates and force the same into intimate frictional contact and into frictional contact with the friction surfaces of the friction shell section. Upon continued relative movement of the follower 15 and the casting A, the shoes F will be forced to slide inwardly on the friction surfaces of the plates C'. Due to the converging relation of the opposed friction surface of these plates, the friction shoes will be advanced at a greater rate than the wedge, thereby additionally compressing the preliminary spring. This action will continue until the inner ends of the friction shoes come into abutment with the spring follower J, whereupon compression of the spring K will be limited and the main spring resistance elements B compressed during the further inward movement of the wedge system with reference to the casing. The described action will continue until the outer ends of the movable plates D are engaged by the follower 15, whereupon the plates D will be moved relatively to the stationary plates C, C and C' during the remainder of the compression stroke. The compression of the mechanism continues either until the actuating force is reduced or the follower 15 engages the outer end of the casting A. In the latter case, the force will be transmitted directly through the casting A to the corresponding stop lugs, thereby preventing the main springs B from being driven solid. In this connection, it will be noted that the spring follower J is initially moved a slight distance away from the inner ends of the combined restoring elements and wear plates H before the movable friction plates are engaged by the main follower 15. This action is important when considering the release of the mechanism, inasmuch as the wedge system will be positively released before the movable friction plates are carried outwardly and restored to normal position.

When the actuating pressure is reduced, the preliminary spring K and the main springs B will restore the friction wedge system and the remaining elements to normal position, the friction wedge system being initially released as hereinbefore pointed out, whereupon the spring follower J will engage the inner ends of the wear plates H and carry them forwardly, the wings 30 of the wear plates in turn, through engagement with the lugs 21, carrying the movable plates D outwardly and positively restoring them to normal position. Outward movement of the parts will be limited by the retainer bolts L co-operating with the wedge block E.

By providing the graduated action comprising the two stages of successively increased preliminary resistance and the stage of final heavier resistance, the gear is particularly adapted for passenger car service as abrupt and sudden shocks are entirely eliminated, due to the blending of the different stages of the compression of the mechanism.

While I have herein shown and described the preferred manner of carrying out my invention, the same is merely illustrative and I contemplate all changes and modifications that may come within the scope of the claims appended hereto.

I claim:

1. In a friction shock absorbing mechanism, the combination with a column element having longitudinally disposed friction surfaces; of a plurality of intercalated, relatively movable friction plates, certain of said plates being stationary with reference to said column element; lateral pressure creating means for compressing said plates and forcing the same against the column friction surfaces, said means including a pair of friction elements co-operating with the friction plates; a preliminary spring initially resisting inward movement of said elements; a main spring resistance adapted to be compressed by movement of said elements after a predetermined compression of said preliminary spring; and a pressure transmitting member movable toward and away from said column and co-operating with said lateral pressure creating means.

2. In a friction shock absorbing mechanism, the combination with a member having longitudinally disposed friction surfaces; a plurality of intercalated relatively movable friction plates, certain of said plates being relatively immovable in a longitudinal direction with reference to said member; a lateral wedge pressure creating means co-operating with said plates for compressing the same against the friction surfaces of said member; a pressure-transmitting element movable toward and away from said member and co-operating with said wedge-pressure-creating means, said element being adapted to engage and move said movable plates after a predetermined initial compression of the mechanism; a preliminary and a main spring resistance successively resisting inward movement of said pressure creating means with reference to said member during said predetermined initial compression.

3. In a friction shock absorbing mechanism, the combination with a friction member having longitudinally disposed friction surfaces; of a pressure-transmitting member; said members being relatively movable toward and away from each other; a plurality of intercalated, relatively movable friction plates, certain of said plates being anchored to said friction member; lateral wedge pressure-creating means cooperating with said pressure-transmitting member for placing said plates under lateral pressure and pressing the same against the friction surfaces of said friction member, said lateral pressure creating means including a plurality of friction elements engaging the friction surfaces of the adjacent plates, the co-operating surfaces of said last named plates and friction elements being inclined to the longitudinal axis of the mechanism; and preliminary and main spring resistance elements successively operative for opposing relative movement of said friction elements and friction member.

4. In a friction shock absorbing mechanism, the combination with a friction shell having interior friction surfaces; of a plurality of intercalated friction plates co-operating with the friction surfaces of the shell, said plates being divided into two groups at opposite sides of the mechanism and certain of said plates being anchored to the shell; a wedge system interposed between said groups of plates, said wedge system including a wedge-pressure-transmitting member and a pair of friction wedge shoes, said shoes having longitudinally disposed friction surfaces co-operating with the innermost plates of said two groups; and successively operative preliminary and main spring resistance elements co-operating with said shoes.

5. In a friction shock absorbing mechanism, the combination with a friction shell having interior friction surfaces; of a plurality of intercalated friction plates cooperating with the friction surfaces of the shell, said plates being divided into two groups at opposite sides of the mechanism and certain of said plates being anchored to the shell, the innermost plates of said two groups having opposed friction surfaces converging inwardly of the mechanism; a wedge system interposed between said groups of plates, said wedge system including a wedge pressure-transmitting member and a pair of friction wedge shoes, said shoes co-operating with the friction surfaces of the innermost plates of said two groups; and successively operative preliminary and main spring resistance elements co-operating with said shoes.

6. In a friction shock absorbing mechanism, the combination with a friction shell having interior friction surfaces; of a plurality of intercalated friction plates co-operating with the friction surfaces of the shell, said plates being divided into two groups at opposite sides of the mechanism, certain of said plates being anchored to the shell and the remainder of the plates being movable relatively thereto; a wedge system interposed between said groups of plates; a main spring follower cooperating with the wedge-system; a main spring resistance; and means for restoring the movable plates to normal position, comprising wear plates interposed between said movable plates and the corresponding walls of the shell, said wear plates being adapted to be engaged and moved by the spring follower during release of the mechanism.

7. In a friction shock absorbing mechanism, the combination with a friction shell having interior friction surfaces; of a plurality of intercalated friction plates co-operating with the friction surfaces of the shell, said plates being divided into two groups at opposite sides of the mechanism; means for anchoring certain of said plates of each group to the shell, one of said last named plates being provided with a lateral extension forming an abutment for the inner ends of the remainder of said last named plates; a wedge system interposed between said groups of plates, said wedge system including a wedge pressure transmitting member and a pair of friction wedge shoes; and a spring resistance co-operating with said shoes.

8. In a friction shock absorbing mechanism, the combination with a friction shell having interior friction surfaces; of a plurality of intercalated friction plates co-operating with the friction surfaces of the shell, said plates being divided into two groups at opposite sides of the mechanism and certain of said plates being anchored to the shell; a wedge system interposed between said groups of plates, said wedge system including a wedge-pressure-transmitting member and a pair of friction wedge shoes, said shoes having longitudinally disposed friction surfaces co-operating with the innermost friction plates of said two groups; a main spring resistance; a spring follower co-operating with the spring resistance; and a preliminary spring resistance interposed between the spring follower and the friction shoes.

9. In a railway draft gear, the combination with front and rear main stops; of a combined spring cage and friction shell co-operating with certain of said stops; a main follower co-operating with the remaining stops; a plurality of intercalated, relatively movable friction plates, certain of said plates being stationary with reference to said combined spring cage and friction shell; lateral pressure creating means co-operating with said main follower for compressing said plates and forcing the same against the friction surface of the shell, said means including a pair of friction elements co-operating with the friction plates; a preliminary spring initially resisting inward movement of said elements; a main spring adapted to be compressed by the movement of said elements after a predetermined compression of the preliminary spring.

10. In a friction shock absorbing mechanism, the combination with a column-acting member; of a plurality of friction plates carried by said member and relatively immovable longitudinally thereof; a plurality of additional friction plates intercalated with said first mentioned friction plates and movable relatively to said member longitudinally thereof; lateral wedge-pressure-creating means associated with said intercalated plates, said means being movable for a predetermined limited distance during the initial portion of a compression stroke relative to said movable friction plates; and spring resistance means co-operable with said wedge-pressure means and movable friction plates and providing a preliminary relatively light resistance and a subsequent greater resistance.

In witness that I claim the foregoing I have hereunto subscribed my name this 9th day of April, 1925.

JOHN F. O'CONNOR.